(12) United States Patent
Furrer et al.

(10) Patent No.: US 7,857,546 B2
(45) Date of Patent: Dec. 28, 2010

(54) METHOD AND APPARATUS FOR CONTROLLING DRAINAGE AND IRRIGATION OF FIELDS

(75) Inventors: Brian Scott Furrer, 332 W. 100 N., Reynolds, IN (US) 47980; Ronald Gene Schlatter, Francesville, IN (US); G. Jason Furrer, Remington, IN (US)

(73) Assignee: Brian Scott Furrer, Reynolds, IN (US)

( * ) Notice: Subject to any disclaimer, the term of this patent is extended or adjusted under 35 U.S.C. 154(b) by 345 days.

(21) Appl. No.: 12/033,121

(22) Filed: Feb. 19, 2008

(65) Prior Publication Data

US 2008/0205987 A1 Aug. 28, 2008

Related U.S. Application Data

(60) Provisional application No. 60/903,687, filed on Feb. 27, 2007.

(51) Int. Cl.
*E02B 11/00* (2006.01)
(52) U.S. Cl. .............................. 405/37; 405/39; 405/51; 405/80; 137/236.1
(58) Field of Classification Search .................. 405/36, 405/37, 39, 40, 51, 80; 137/236.1, 397, 398
See application file for complete search history.

(56) References Cited

U.S. PATENT DOCUMENTS

| | | | | |
|---|---|---|---|---|
| 2,923,308 A | * | 2/1960 | Shohan | 137/107 |
| 2,991,625 A | * | 7/1961 | Anderson et al. | 405/104 |
| 3,173,152 A | * | 3/1965 | McCrink | 4/314 |
| 3,524,470 A | * | 8/1970 | Kah, Jr. et al. | 137/624.18 |
| 3,547,355 A | * | 12/1970 | Salazar | 239/547 |
| 3,974,654 A | * | 8/1976 | Mirto, Jr. | 405/127 |
| 4,014,361 A | * | 3/1977 | Rodieck | 137/122 |
| 4,497,333 A | * | 2/1985 | Rodieck | 137/122 |
| 5,161,912 A | * | 11/1992 | Schlueter et al. | 405/39 |
| 5,213,130 A | * | 5/1993 | Al-Hamlan | 137/122 |
| 5,462,075 A | * | 10/1995 | Persson | 137/2 |
| 6,988,853 B1 | * | 1/2006 | Kuntz | 405/96 |
| 7,033,108 B1 | * | 4/2006 | Hummert et al. | 405/37 |
| 7,201,333 B2 | * | 4/2007 | Yoshikawa et al. | 239/565 |
| 7,237,980 B2 | * | 7/2007 | Fu | 405/36 |

* cited by examiner

*Primary Examiner*—Tara Mayo-Pinnock
(74) *Attorney, Agent, or Firm*—Wildman, Harrold, Allen & Dixon LLP

(57) ABSTRACT

A method of and apparatus for controlling drainage/irrigation of a field includes laying out a network of spaced, interconnected water level-responsive valves coupled to drainage tiles, which typically may include a main line and a number of lateral lines, extending from higher elevations to lower elevations and exiting through a manually controlled main valve to a drainage ditch. When the water level adjacent a valve is below a predetermined level, the valve is open allowing water to flow down to the lowest level. As the ambient water level in the soil rises, the valve's float also rises, causing the valve to close when the water reaches a predetermined level and producing a "terracing" effect wherein the rising water is sequentially stored at increasingly higher elevations for irrigating these elevated areas. Overflow conduits associated with each valve allow water to discharge into the drainage ditch when the sub-surface water level is too high.

13 Claims, 4 Drawing Sheets

METHOD AND APPARATUS FOR CONTROLLING DRAINAGE AND IRRIGATION OF FIELDS

CROSS-REFERENCE TO RELATED APPLICATION

This application claims priority of U.S. Provisional Application No. 60/903,687 filed on Feb. 27, 2007, entitled "Method and Apparatus for Controlling Drainage and Irrigation of Fields".

FIELD OF THE INVENTION

The present invention relates to the control of sub-surface water levels and drainage in fields having different elevations, i.e., sloped. In particular, the invention is directed to agricultural fields, that is, fields used for growing crops.

BACKGROUND OF THE INVENTION

Systems are available for the draining of fields having different elevations. In general, the overall object is to maintain water at the root zone of the crop to promote growth, but to avoid excess water, which is harmful to crops. Typically, a manually operated valve is provided with a housing incorporating an outlet pipe which may feed a drainage ditch or other water tributary. The crop field in which it is desired to control the drainage, is provided with a principal or "main" drain tile and a network of drainage tile tributaries (called "lateral lines" or simply "laterals") joined to the main line and extending up the various elevations of the field desired to be drained. This type of system has certain disadvantages, primarily in that, as is well known, land at higher elevations is consistently drier than land at lower elevations. This is because in a typical arrangement of drain tiles, all of the tiles (or lines) are open at all times, and the only means of control is a manual valve that controls flow through the outlet pipe. Thus, water flows (underground) continuously to lower levels under gravity as long as the manual valve is open, thereby leaving higher elevations to be depleted of water and therefore become dry sooner than lower levels.

SUMMARY OF THE INVENTION

The present invention provides, in combination with an outlet pipe and a manual control valve for controlling the flow of water through the outlet pipe, a network of lateral lines of conventional drainage tile, all joined to a main line (usually at different elevations) and feeding the discharge pipe through a manual control valve.

Each lateral line typically extends up through different elevations, like the main line, to drain the fields. According to the present invention, each of the laterals, as well as the main line, includes a series of level-responsive valves, located at progressively higher elevations along each of the main and lateral lines. Typically, adjacent valves in a line are placed, as in conventional systems, at elevation differences which may range from 0.6 ft. to approximately 2 ft. One type of level-responsive valve, disclosed in the present application, by way of example, is a float valve. The term "level responsive" means the valve is normally open, but when the water level exceeds a predetermined level, the valve closes, shutting off the flow of water from a higher line into the valve.

A main line or conduit of drain tiles with spaced level-responsive valves, and a number of secondary lines, constructed in a manner similar to the main line, and referred to as "laterals," feed into one another, or into the main line, depending on the topography of the field being managed. The tiles are well known as semi-rigid or rigid conduit (or interconnected sections of drain tiles) having apertures spaced throughout to permit sub-surface water to enter the tile and flow to a lower elevation.

As is well known, water accumulates beneath the surface of soil, and depending upon the amount of rain that falls over time, the sub-surface level of water rises and falls.

The present invention is concerned principally with, though not limited to, sub-surface water levels down to a level of approximately 12-48 inches below the surface, although these levels are not essential limits. When the water level adjacent the valve (i.e., in the adjacent soil) is below a predetermined level relative to a given valve, the valve is open. As the water level in the soil (sometimes referred to as the ambient or surrounding level) rises, the float also rises, causing the valve to close when the water reaches a predetermined level.

In each line (i.e., main and laterals), as the water level rises, the lowest valve in a series of interconnected valves will close first because surface water runs to a lower level and sub-surface water will normally accumulate at the lower levels first, if there are no pockets or ponds at the higher levels. In other words, for a given distance below the surface (e.g. three feet) water will normally rise to that given sub-surface level for valves located at lower elevations before it reaches that given distance for valves at higher elevations, all other factors being equal. The closing of the level-responsive valves progresses upwardly as the water level continues to rise at higher elevations. That is, as each valve at a lower level closes, the ambient water level at the next higher valve will increase until that valve also closes. This has the effect of "daming" the lines at progressively higher levels until, eventually, water is stored at the next higher level, not just in the valve, but in surrounding soil as well. This action is sometimes referred to herein as "terracing", which is intended to mean that as additional water is available (assuming the manual valve is closed), the level at which sub-surface water will be stored will rise at higher elevations. In other words, without the level-responsive valves, all the water would flow through the drain lines down to the lowest elevation and not be retained at the higher elevations, whereas, with the present invention, as is desirable, the water is available directly to standing crops or for irrigation purposes at higher elevations.

In another aspect of the invention, the preferred level-responsive valve includes a flap type valve member which is hinged adjacent an opening in the inlet of the valve. The valve body includes an inlet section which is adapted to be coupled to a section of tile in a line. The valve flap is connected by means of a rigid link to a float which is received in a vertically oriented cylindrical reservoir, which is closed, but not sealed. The bottom of the reservoir houses the valve flap and couples to the inlet conduit, and includes an outlet adapted to be coupled to a downstream section of tile. As the water level rises in the valve housing, the float rises, ultimately closing the flap valve and shutting off the flow of water from the upstream tile section. The float member is not sealed against the inner wall of the cylindrical reservoir portion of the valve. Rather, rising water may flow about the float to a level above the float, after the valve is closed, and an aperture in the housing permits air to escape so that the movement of the float is not impeded.

As the level-responsive valve closes, a rising or increased water level exists in the housing or reservoir of that particular valve. That is, the water level rises above in that particular valve and water accumulates in the upper tile which feeds into that valve. A similar operation occurs at the next higher elevation as the underground water level continues to rise at progressively higher elevations. This action continues as further water accumulates or the uppermost tile is filled, but there is no other limit.

In another aspect of the invention, a modification of the level-responsive valve includes an overflow conduit having a lower inlet opening communicating with the inlet connector of the valve body. The overflow conduit extends upwardly from its inlet opening, and has an upper outlet which communicates with the cylindrical reservoir at a location above the flotation device. In the case of a heavy rain which is unexpected or a water accumulation that may occur when the proprietor is absent for an extended period and the manual valve is closed, the ambient water level may rise significantly. As the ambient water level rises at the higher elevations, however, with the overflow feature, water is permitted to flow upwardly through the overflow conduit into the reservoir above the flotation device in the valve, thence past the closed valve and downwardly into the valve body at a location downstream of the closed valve flap and thence out the valve and downwardly through the next lower tile section. This excess or overflow action continues in lower sections, so long as excess water persists, so that excess water may flow downwardly into the manual valve, which is provided with a standpipe downstream of the manual valve which permits the excess water to flow into the ditch, even if the manual valve is closed.

Thus, the present system operates without electrical power and feed lines; and the system (at least so far as it is located in crop fields) is completely underground, providing no surface obstacles to farmers.

Other features and advantages of the present invention will be apparent to those skilled in the art from the following detailed description of the illustrated embodiments, accompanied by the attached drawing wherein identical reference numerals will be used for like parts in the various views.

DETAILED DESCRIPTION

Figure 1:
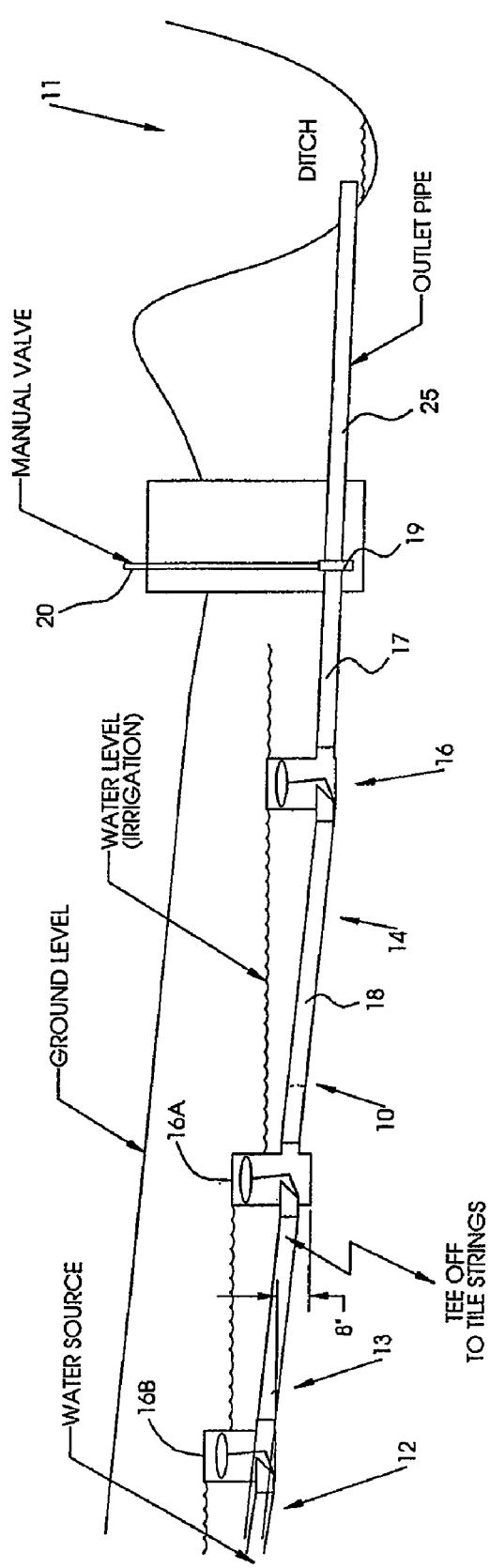
FIG. 1 is a schematic diagram of a main line of a managed drainage system according to and incorporating the present invention.

Referring first to FIG. 1, reference numeral 10 generally designates a single line for conducting subterranean water from a higher elevation (to the left in FIG. 1), to a lower elevation proceeding toward the right, and ending in discharging the water into a drainage ditch generally designated 11, or other suitable discharge waterway.

The overall system typically will include a method of controlling drainage/irrigation of a field comprising a network of interconnected drainage lines, which typically may include a main line and a number of lateral or auxiliary lines ("laterals"), extending from a higher elevation to a lower elevation and connecting together to form a network exiting through a manually controlled main valve to a drainage ditch or other water passage. The drawings show idealized installations. For example, the drain lines need not be parallel to the surface, nor is the depth of the lines critical. Maintaining good drainage, however, is desirable.

The lateral lines may be constructed similar to the main line, and coupled to the main line at various elevations by tees. Thus, only the main line need be described further.

A series of level-responsive valves are incorporated in the main and lateral lines at predetermined elevations, that is, different heights. Typically the valves are placed at approximately the same depth, but this is not essential to drain proper operation or achieving the desirable terracing effect, as persons skilled in these matters will understand.

Each level-responsive valve is normally open (i.e. to permit the flow of water) until the surrounding ambient water level (subterranean) for that particular valve location reaches a predetermined level relative to the valve. When the predetermined level for each valve is reached, it causes that valve to close, thereby restraining drainage of sections of the line at higher elevations. When it is desired to retain water at higher elevations, the manual main valve is closed, permitting water to accumulate and be retained at higher elevations by closing the level-responsive valves at progressively higher elevations as the level of sub-surface retained water rises, thereby causing a cascading or "terracing" of water levels at upper elevations, making sub-surface water available to plant roots at the higher levels. When the manual valve is opened, the field drains normally.

The level-responsive valve may be but is not necessarily a flotation valve. More basically, it is a valve which is actuated (closed) when the ambient water level (relative to that valve) is above or reaches a predetermined level. A modification of the valve includes an overflow channel or conduit which permits excessive water at elevations above that particular valve to bypass the closure member of the level-responsive valve, thereby permitting the field to drain under conditions of excess ambient water.

Turning then to FIG. 1, the illustrated embodiment includes a number of individual tiles or sections which may be similar (except that the main line may have larger diameter tiles than the laterals), so that only one line need be described in more detail for an understanding of the invention. A main line with three sections, designated respectively 12, 13 and 14, located at progressively lower elevations, is shown in FIG. 1.

Referring now to the lowermost section 14, it includes a lower level-responsive valve 16 and a length of drain tile 18 leading to the inlet of the valve 16. The outlet of valve 16 is provided with a discharge conduit leading to the manual valve 19 which is provided with an actuator 20 for opening and closing the manual valve. The outlet of the manual valve is provided with an outlet pipe 25, which is preferably rigid without lateral openings, and it passes through the nearby retention wall or side beam of the drainage ditch 11, discharging into the ditch itself.

Referring back to section 14, each drainage section includes a level-responsive valve and an inlet (i.e., upper) tile section which collects subterranean water through lateral openings and passes water from the next higher section and valve (16A in the illustrated case) down to the lower section and lower valve (16, in this case).

As seen in FIG. 1, each of the two higher sections, 12, 13 are similar in structure to section 14. By way of example, the height of each of the level-responsive valves, the other two being designated 16A and 16B in FIG. 1, may be approximately 6-20 in. above the next lower valve. The tile sections then generally follow the contour of the surface of the soil being drained. Each of any number of lateral lines, feeding into another lateral or the main line, may be included depending upon the shape and typography of the field.

When it is dry and, for example, crops are growing, the manual 19 valve may be closed to conserve water at upper levels for the crop, as will be described in more detail below.

As used herein, a level-responsive valve is a valve which is normally open, and thus permits the passage of water, when the surrounding water level is below a predetermined level, and which then closes when the ambient subterranean water level is above the predetermined level, thus inhibiting the flow of water at the valve inlet. Persons skilled in the art will recognize that the two predetermined levels need not be the same. In other words, the valve could close at one water level, and open at another, if desired.

The setting of the manual valve 19 determines how the system will operate. Briefly, there are two modes of operation, namely when the manual valve is closed, and when the manual valve is open.

Typically, the manual valve 19 will be open during periods of excess rain to relieve flooding or puddling in the field being drained, or when it is desired to access the field with equipment, such as a tractor, backhoe, combine, or the like. When the manual valve is closed during dry seasons or the growing season, the flow of water into the ditch 11 is stopped, and water is retained in the soil and accumulates at higher elevations, thereby minimizing the loss of soil and other nutrients which would otherwise wash away with the water. Under such operating conditions, the water simply accumulates above the elevation of each manual valve and is not permitted to discharge through the drainage lines (including the main line and all laterals).

When the manual valve is closed, as described, it further reduces run-off and the discharge of nitrates, for example, into the drainage ditch, as is desirable.

When weather conditions are dry or it is desired to maintain the soil wet, as may occur at any time but particularly during a growing season, the manual valve 20 is closed to permit, as will be described, the retention of water or "terracing" of water levels at higher elevations.

Still referring to FIG. 1, when the manual valve 20 is closed, and there is sufficient rainfall, by way of example, the ambient sub-surface water level rises at elevations above the lowermost manual valve 16A. Since the manual valve 19 is closed, water does not flow through the various tiles and conduits comprising the main line or laterals (except perhaps under overflow conditions, as will be described).

It has been established that when a field is provided with the instant system and, for example, the areas at a lower elevation are not drained, due to the closing of the manual valve 19, water is retained at higher elevations (for example, at the next higher level-responsive valve). And for each higher section of drainage line (main or lateral), ambient water levels rise. This is illustrated in FIG. 1, which is an idealized diagram. As water collects about the elevation of valve 16, the level rises until it closes the lowest valve 16, as will be described in more detail below. Although each respective water level is illustrated in FIG. 1 as a generally horizontal level, that need not be the case, because the water level tends to follow the inclination of the surface of the soil, generally, but not necessarily at the same slope. Rather, what is significant is that water is retained at the higher elevations, providing a terracing effect overall, as diagrammatically illustrated in FIG. 1. If, during such a dry or growing season, a severe storm or substantial extended rain is expected, the manual valve may be opened at any time to permit the outflow of excess water into the drainage ditch.

When the manual valve is opened, after it may have been closed for a period of time so that water may be stored above the elevation of the drainage valve, it nevertheless occurs that each of the drainage sections discharges the water contained therein at substantially the same time, so that the drainage of the system is fairly rapid, and lateral seepage into the drain tiles may begin.

Figure 4:
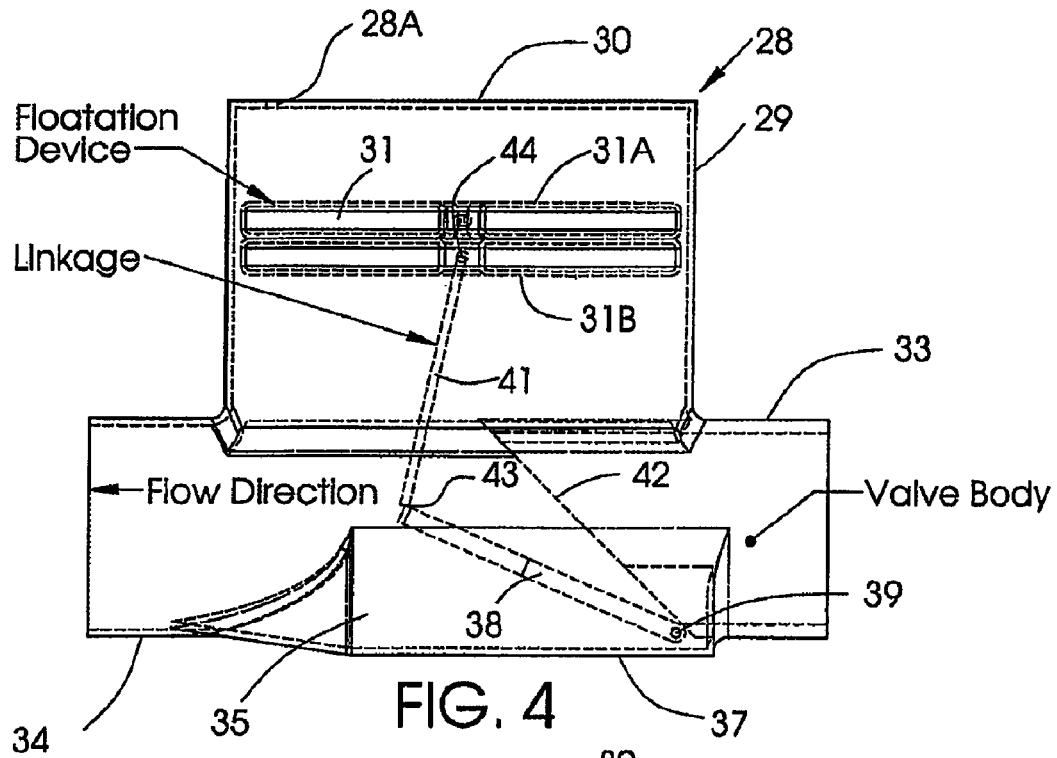
FIG. 4 is a vertical, longitudinal cross sectional view of the valve of FIG. 3.
Figure 3:
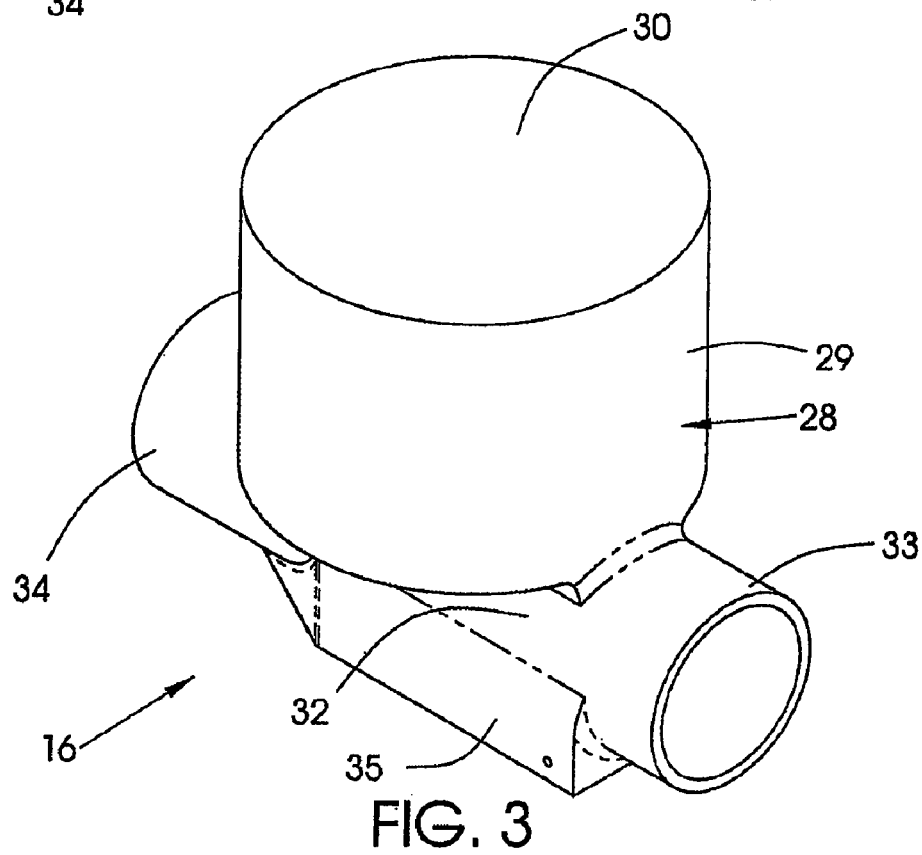
FIG. 3 is an upper perspective view taken from the discharge end, of a level-responsive valve constructed according to the present invention.

Turning now to FIGS. 3 and 4, there is shown a level-responsive valve such as the one previously designated 16 or 16A, 16B (i.e., without an overflow feature). The level-responsive valve 16 includes an upper housing 28 having a cylindrical side wall 29 and a top 30, the cylindrical side wall 29 and the top 30 form a housing for a flotation device seen at 31 in FIG. 4. Beneath the housing 28, there is a conduit 32 having an inlet connector section 33 and an outlet connector section 34. The connector sections 33, 34 are adapted to be coupled to an associated drain tile. Further, the lower portion of the conduit 32 is provided with a base portion 35 which may have a generally flat bottom 37 (FIG. 4) so as to place the valve in an upright position and provide stability when placed into a ditch provided for the drainage section.

Turning now to FIG. 4 in particular, the flotation device 31 may be formed of any material or construction which floats in, but preferably does not absorb water, such as closed-cell polystyrene or the like, or a hollow disc. Further, the float may be provided as illustrated in FIG. 4, in multiple sections, 31A, 31B which may be added or removed, so as to adjust the flotation of the device in accordance with the design of the system.

A flapper style (that is, generally flat) sealing member 38 provides a valve number which is pivotally mounted at 39 to a lower portion of the housing 35, so that the valve number 38 will rotate above the pivot 39 along the direction of flow between the open position shown in FIG. 4, and a fully raised position in which the upper surface of the valve number 38 rests against and seals an inclined inlet opening 42 of the discharge connector section 34 of the valve, thereby inhibiting the flow of water into the discharge connector section 34—that is, from right to left as seen in FIG. 4 (wherein water flows from right to left).

The upper portion of the housing 28 may have one or more vent openings (such as the one designated 28A) so that the valve number 38 may rise and fall without compressing the air above it. The sides of the float member 31 do not seal against the inner surfaces of the cylindrical wall 29. Rather, there is sufficient clearance so that water may pass around the flotation member.

As will be appreciated from FIG. 4, as the water level rises in the upper reservoir 28, the flotation member also rises, and it closes the valve by rotating and raising the sealing plate 38 to engage the inward edge or mouth 42 of the discharge section 34. Towards this end, a link 41 is pivotally connected at 44 to the flotation number 31, and at its lower end, it is pivotally connected at 43 to the sealing plate 38. Alternatively, link 41 could be a tether or other flexible member.

In operation, the system of FIG. 1 depends upon the state of manual valve 20. If the manual valve 20 is closed, as may well be the case in winter or in dry periods of the growing season, any water that does fall at elevations above the manual valve (that is, in the field being drained) accumulates at elevations above the location of the manual valve. Specifically, water will flow into, and fill the lower conduit 17 leading into the closed manual valve 19. Eventually the lowest one of the level-responsive valves 16 will become filled with water. Even though the associated valve inlet opening is open, water nevertheless will build up in the next higher conduit 18 because conduit 17 is blocked. Eventually valve 16 closes as its flotation device rises and shuts the valve member 38 against opening 42. Water will then rise within conduit 18 and the next higher valve 16A, thereby permitting water to build up at elevations above valve 16A as it closes, eventually reaching the level of the next higher valve 16B, and so on, to even higher elevations. This has the effect of causing water to be stored at higher elevations, and therefore, available for irrigation and/or crops at those higher elevations. The water is thus preserved at higher elevations in a step-like reservoir, (i.e. terrace), although the illustration of FIG. 1 is both diagrammatic and idealized for purposes of illustration.

When the manual valve 20 is placed in the open condition, the water is free to flow directly into the ditch into the outlet pipe 25. Moreover, water is simultaneously permitted to flow through all of the higher valves above which water has been retained since the valves and conduit sections will drain fairly rapidly, so that all of the valves operate substantially simultaneously in a cascading fashion to permit water, or excessive water, to flow through the manual valve. The water stored in adjacent soil will then drain normally into the adjacent tiles or conduit.

There may be situations in which the operator of the system will desire protection from excessive or heavy, unexpected rainfall. Such occurrences, of course, may be more frequent depending upon geographic location. Nevertheless, there may be a desire for this type of protection.

Figure 2:
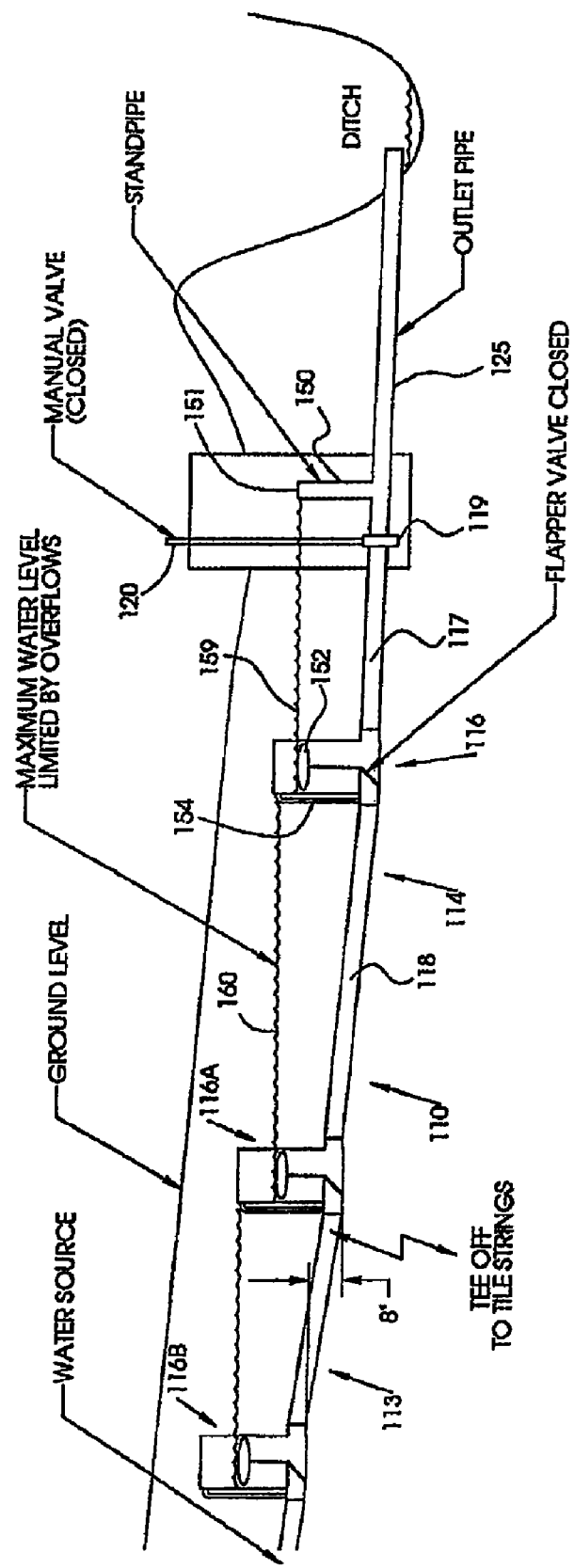
FIG. 2 is a schematic diagram similar to the FIG. 1 illustrating operation when each of the level-responsive valves is equipped with an overflow conduit which acts to relieve excess accumulation of ambient water.

Turning now to the system of FIG. 2, this system is provided with a series of overflow conduits, to be described, which act only in the state or states discussed above in which the manual valve is closed. In the system of FIG. 2, elements which have been employed, which are substantially the same as similar components in FIG. 1 are identified with the same reference numeral preceded by a "1". In addition, there is a vertical standpipe 150 within the housing of the manual valve 120, extending vertically above the inlet section of the outlet pipe 125. The upper orifice of the standpipe 150, designated 151 is at an elevation above the position of the float number 152 of the immediately higher level-responsive valve 116 sufficient to close valve 116. In other words, the float number 115 of the next higher valve in the closed position, will be beneath the water level corresponding to the elevation of the input orifice 151 of the standpipe 115 located in the housing of the manual valve.

Similarly, each of the level-responsive valves 116, 116A and 116B, include an overflow conduit, the overflow conduit for the level-responsive valve 116 being designated 154 in FIG. 2. Each of the overflow conduits associated with a level-responsive valve extends from and communicates with the input connector section for that valve, to permit water to flow upwardly from the descending discharge conduit, to an upper portion of the reservoir of the valve housing above the "closed" level for the float, as will be described in further detail presently. In operation, when the water level rises to an unusually or undesirably high level, such as is set by the elevation of the inlet orifice 151 of the standpipe 150, and the elevation of the upper outlet opening of the overflow conduits of the level-responsive valves (see the water level on the second tier designated 160 in FIG. 2) extends above the water level 159 of the next lower tier (the upper end of which is defined by the elevation of the first valve 116), then water will flow upwardly in the overflow conduit 154, into the housing of the next lower valve, and thence about the float for that lower valve (thereby circuiting about the closed valve member) and into the discharge conduit 117 and then into standpipe 151, into the ditch. This is a cascading action beginning with the highest water level, and provides a means for discharging excessive water when the manual valve has been closed.

Figure 6:
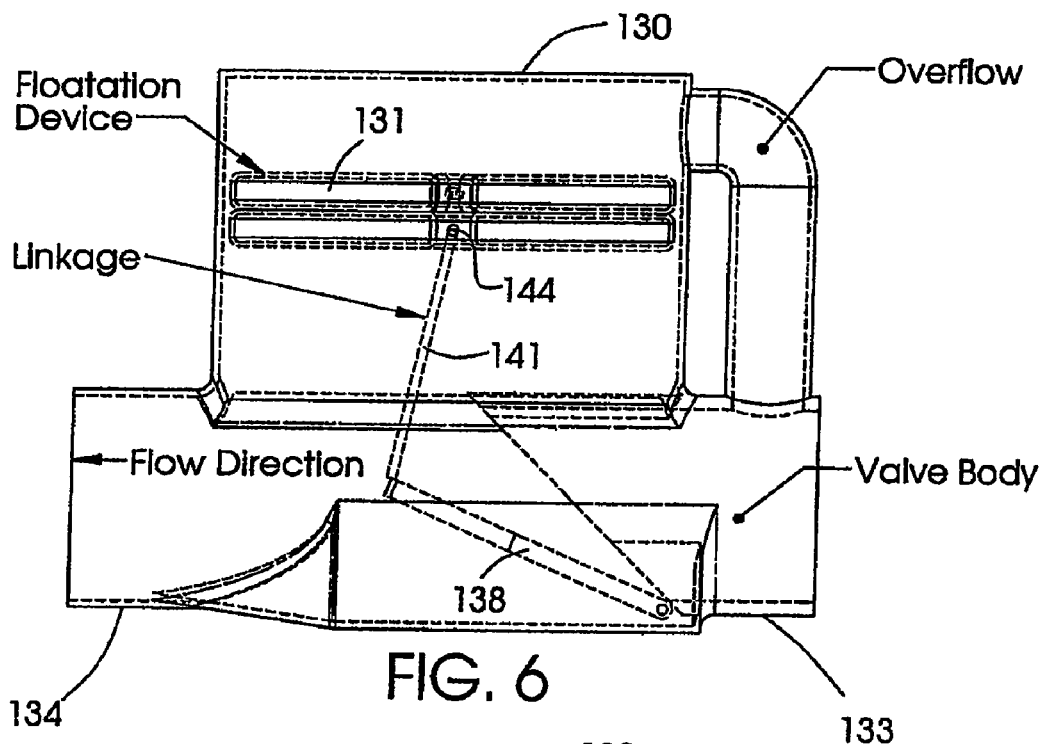
FIG. 6 is a vertical cross sectional view of the valve of FIG. 5 taken along the axis of the drain conduit.
Figure 5:
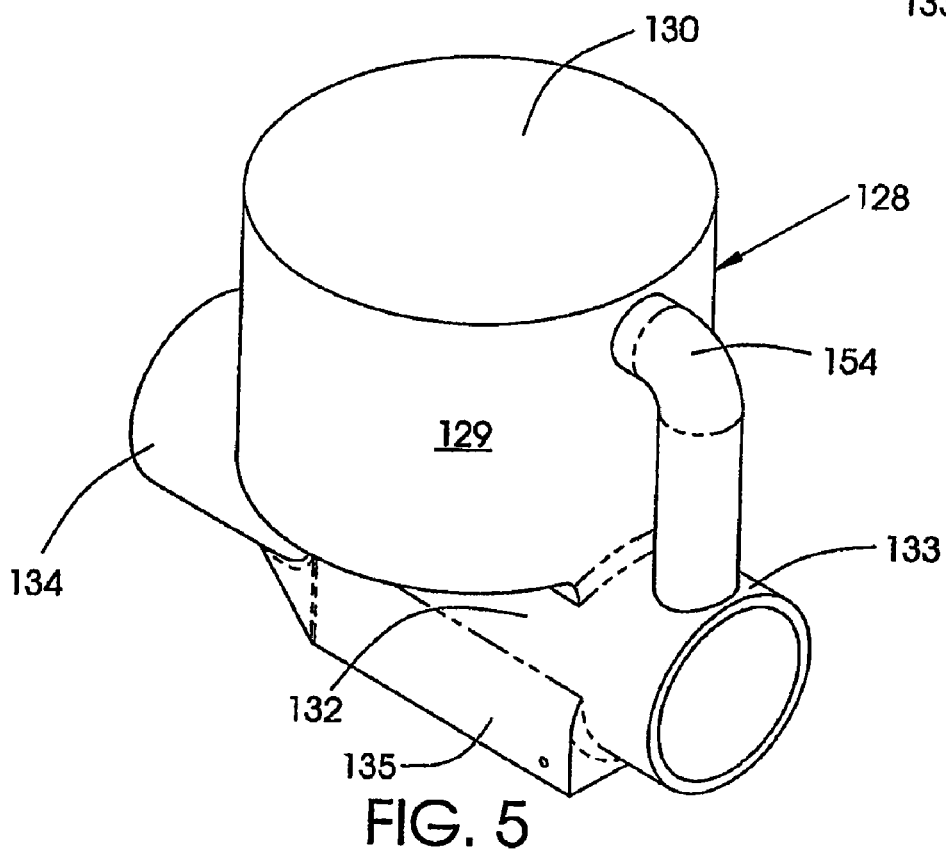
FIG. 5 is an upper perspective view, taken from the inlet side of the level-responsive valve of FIG. 3, incorporating an overflow conduit.

Turning now to FIGS. 5 and 6, again those portions of the overflow valve, which have already been described in connection with the valve of FIGS. 3 and 4, are identified by a similar reference preceded by a "1". As can be seen in FIG. 5, in particular, the overflow conduit 154, extends from the inlet connector 133 upwardly into the top of the cylindrical side wall 129 of the housing 128 so that as water drains into the next lower tile section, and the level rises above the outlet orifice of the overflow conduit 154, the water will flow into the valve housing, circumventing the closed valve, and through the discharge connector 134 of the valve housing, due to the high water level above the level of the valve. It will be understood that water at the lower sections is being drained through standpipe 151 and is being routed around the level responsive valves of lower sections, even though they are closed.

In summary, the system of FIG. 2 acts the same, for normal water levels, as described in connection with FIG. 1. However, if the water level at upper elevations rises above that set by the overflow conduit, excess water will be discharged through the standpipe of the manual valve, and into the ditch.

The invention claimed is:

1. Apparatus for draining a field of water while permitting water to be stored at higher elevations, comprising:
   at least one line of drainage tile arranged to extend from a higher elevation to a lower elevation;
   a manual shut off valve for opening or shutting off said line at said lower elevation;
   at least one level-responsive normally-open valve comprising:
   a body having an inlet and an outlet for connecting in said line of drainage tile;
   a housing for storing water; and
   a valve member responsive to the level of water in said housing for stopping the flow of water through said valve when the water level in said housing reaches a predetermined level, whereby when said valve member shuts off the flow of water through said valve, water accumulates within said housing and in drainage tile feeding said level-responsive valve.

2. The apparatus of claim 1 further comprising a plurality of said level-responsive valves operatively incorporated into said line, each level-responsive valve located at a different elevation, and being coupled to an outlet of an associated drainage tile at a higher elevation.

3. The apparatus of claim 2 wherein each valve includes a respective closure member and each closure member of said level responsive valves is pivotally mounted to move between open and closed positions relative to an inlet drainage tile upstream in the direction of water flow.

4. The apparatus of claim 1 wherein each closure member comprises a flap pivotally mounted in said valve and arranged to close an inlet opening to said valve, said inlet opening coupling said valve to a drainage tile disposed upstream thereof, each valve further including a float operatively connected to said flap and rising and lowering within said valve in accordance with the water level in said housing thereof to close and open said inlet opening respectively.

5. The apparatus of claim 4 wherein said valve includes an overflow conduit extending from a level adjacent a base of said valve to a location above said float and in connection with an associated drain tile immediately upstream of said valve with a location of said housing above the level at which said valve is closed by said float.

6. The apparatus of claim 4 wherein said valve member comprises a flapper pivotally mounted to the valve housing for movement between an open position and a closed position at which said flapper shuts an inlet opening to said housing.

7. The apparatus of claim 6 further comprising a link connected at one end to said flapper and pivotally connected at another end to said float.

8. The apparatus of claim 4 wherein said float is generally circular about its circumference and said housing contains a cylindrical wall receiving said float, said float riding on water within said housing.

9. The apparatus of claim 8 further including an opening in said housing at a level above said float to permit air to egress said housing as said float rises in response to the level of the water.

10. The apparatus of claim 1 wherein at least some of said tiles are rigid.

11. The apparatus of claim 1 wherein at least some of said tiles are flexible.

12. The apparatus of claim 1 comprising a plurality of said valve members, each located at a different elevation and in communication with a common drain line.

13. A method of draining a field of water while permitting water to accumulate at higher elevations, comprising:
- providing a drain tile forming at least one line extending from an upper elevation to a lower elevation and including a manual shut off valve at said lower elevation;
- providing a plurality of level responsive valves in said line, each at a different elevation and provided with a housing including an inlet and an outlet;
- closing said manual valve when the water level in an associated valve reaches a predetermined level to permit water to rise in said line above the closed valve; and
- closing the inlet of each valve of said plurality in succession and in order of lower to higher in response to rising water levels.

* * * * *